United States Patent
Tippett

(10) Patent No.: US 6,596,114 B2
(45) Date of Patent: Jul. 22, 2003

(54) COMPOSITE EXPANSION JOINT MATERIAL

(75) Inventor: Stephen W. Tippett, Bedford, NH (US)

(73) Assignee: Textiles Coated, Inc., Amherst, NH (US)

( * ) Notice: Subject to any disclaimer, the term of this patent is extended or adjusted under 35 U.S.C. 154(b) by 0 days.

(21) Appl. No.: 09/826,599

(22) Filed: Apr. 5, 2001

(65) Prior Publication Data

US 2001/0018307 A1 Aug. 30, 2001

Related U.S. Application Data

(62) Division of application No. 09/267,592, filed on Mar. 12, 1999, now Pat. No. 6,244,488.

(51) Int. Cl.$^7$ .................. B32B 27/02; B32B 27/12
(52) U.S. Cl. .................. 156/229; 156/60; 156/160; 156/250; 442/183; 442/289
(58) Field of Search ................. 156/229, 157, 156/228, 196, 160, 161, 60, 250, 271; 428/48; 442/289, 183

(56) References Cited

U.S. PATENT DOCUMENTS

| | | | |
|---|---|---|---|
| 4,732,413 A | * | 3/1988 | Bachmann et al. ......... 285/229 |
| 4,770,927 A | * | 9/1988 | Effenberger et al. ........ 428/367 |
| 5,141,800 A | * | 8/1992 | Effenberger et al. ........ 442/261 |
| 5,164,031 A | * | 11/1992 | Matsuyama et al. ........ 156/157 |
| 5,230,937 A | * | 7/1993 | Effenberger et al. ........ 428/113 |
| 5,296,287 A | * | 3/1994 | Ribbans ...................... 428/421 |
| 5,357,726 A | * | 10/1994 | Effenberger et al. ........ 156/161 |
| 5,385,765 A | * | 1/1995 | Springer et al. ....... 112/475.01 |
| 5,843,258 A | * | 12/1998 | Murakami .................. 156/137 |

OTHER PUBLICATIONS

Garlock advertising literature, 6 pages, dated Aug. 1976.
Pathway product description, pp. 8/11–11/11 dated Mar. 29, 1989.

* cited by examiner

Primary Examiner—Richard Crispino
Assistant Examiner—Sue A. Purvis
(74) Attorney, Agent, or Firm—Samuels, Gauthier & Stevens

(57) ABSTRACT

A flexible composite expansion joint material comprises a fluoropolymer containing woven fabric substrate with mutually perpendicular warp and fill yarns. The substrate is subdivided into plural segments which are arranged successively in a longitudinally extending assembly with the warp and fill yarns of each segment extending obliquely with respect to the assembly length. At least one other component extends over the assembly length. The successively arranged substrate segments are spliced together and integrally joined to the other component by lamination under conditions of elevated temperature and pressure.

22 Claims, 2 Drawing Sheets

COMPOSITE EXPANSION JOINT MATERIAL

PRIORITY INFORMATION

This application is a divisional application of U.S. Ser. No. 09/267,592 filed Mar. 12, 1999, now U.S. Pat. No. 6,294,488 B1.

BACKGROUND OF THE INVENTION

1. Field of the Invention

This invention relates to composite materials employed in the fabrication of nonmetallic expansion joints, in particular those serving as flue duct seals in low pressure high temperature gas service installations.

2. Description of the Prior Art

Nonmetallic expansion joints are used in both liquid service and gas service installations.

Liquid service expansion joints must be capable of operating under wide ranges of pressure and temperature, e.g., pressures ranging from full vacuum to 150 p.s.i. and higher, and temperatures ranging from below 0° F. to 300–400° F. Such expansion joints are predominantly manufactured from single ply materials supplied in roll form as "roll goods", e.g., rubber and woven fabrics. Expansion joint manufacturers typically employ molding and hand lay up techniques to produce composites of such materials with relatively thick cross sections on the order of 0.5 inches. The resulting expansion joints are very stiff, thereby requiring significant forces to generate any movement or flexing.

In contrast to the foregoing, gas service expansion joints, more commonly referred to as "flue duct seals", are designed to operate under relatively low pressure conditions, typically ±5 p.s.i., and at temperatures ranging from below 0° F. to 1400° F. and higher. The composite materials used in the manufacture of flue duct seals can have relatively thin cross sections on the order of 0.006 to 0.25 inches, typically including a single ply of woven fabric combined with both rubbers and perfluoroplastics. Thicker constructions include additional woven fabric plies. Such composite materials are usually manufactured by coating or laminating techniques and are also supplied as roll goods to expansion joint manufacturers. Ideally, these composite materials should be inherently flexible, and capable of readily elongating under relatively low stress conditions.

The woven fabrics used as the load bearing components of expansion joint composites are commonly "square weaves". Such fabrics are high modulus materials that do not readily stretch or elongate when stressed in the direction of their warp or fill yarns. However, the same materials are capable of readily stretching if they are arranged with their yarns on a bias with respect to the direction of stress. Thus, in situations where the ability to readily stretch or elongate is critical, as is often the case in the expansion joint industry, expansion joint manufacturers have resorted to relatively complex and labor intensive fabrication techniques in order to achieve a bias orientation of the conventional composite materials currently available on the open market.

During at least the last 20–30 years, this has been accomplished by cutting the conventional composite materials into discrete segments which are reoriented by 45° and then spliced back together to form so called "belts". The belts are then fabricated into expansion joints, with the warp and fill yarns of the load bearing components arranged on a bias with respect to the expected directions of major stress.

This procedure was reasonably suited to the earlier composite materials, which typically comprised single plies of woven fiberglass coated with rubber. Splicing was easily achieved at relatively low temperatures. However, with the enactment of more aggressive air pollution legislation in the late 1960's and early 1970's, there arose a need for more sophisticated composite materials, with greater resistance to chemical attack and with a greater ability to span wider gaps between equipment components.

To meet these demands, more complex rubber composites came on the market, with fluoroelastomer coatings and multiple layer constructions containing two or more woven fabric plies. These more complex composite constructions could not readily be subdivided and spliced back together to achieve a bias orientation of the woven fabric load bearing components. Thus, bias orientation remained largely limited to the fabrication of expansion joints from the earlier composite materials.

In the 1980's and 1990's, composite expansion joint materials combining woven fabric load bearing components with perfluoroplastics such as polytetrafluoroethylene (PTFE) began acquiring a meaningful market share. However, splicing of these materials involved new fabrication procedures requiring the use of irons heated to elevated temperatures on the order of 725° F. Such procedures were unfamiliar to the expansion joint industry. Thus, very little bias production of expansion joints employing these PTFE based composites took place, and then only by cutting the materials into segments which were then reoriented on a bias and spliced back together, as was done earlier with the simple rubber based products.

In recent years, a significant and increasing amount of new power generation is being based worldwide on gas and diesel turbines. This equipment operates at much higher temperatures, with an attendant increase in thermally induced movement between equipment components. This has prompted the development of even more complex fluoropolymer based composite materials, typically comprising PTFE coated woven fabric substrates combined with sophisticated corrosion barriers, thermal barriers and other associated components in multi layer laminated composites.

To date, use of these more sophisticated composite materials in bias oriented configurations has been limited because conventional techniques for doing so dictate that the entire composite must be cut through in order to provide segments which can be reoriented and reassembled by splicing. The procedures for splicing the individual composite plies in a manner that retains their continuity are exceedingly difficult and often unreliable. Failure to properly splice the corrosion and/or thermal barrier components can result in the fabrication of flue duct seals which fail prematurely in service.

Use of these materials without arranging their fabric substrates on a bias has led to other problems, particularly in flue duct seals operating at very high temperatures, where movement between equipment components is most pronounced. For example, the inability of such composite materials to readily elongate or stretch can lead to the formation of severe creases and/or wrinkles. When wrinkles develop, the resulting folds lose the cooling effect of ambient air. This in turn can produce "hot spots" or burned areas that will require replacement of the expansion joint within a very short period.

Accordingly, it is an object of the present invention to provide a flexible composite expansion joint material having as its load bearing component a fluoropolymer containing woven fabric substrate which has been segmented and reoriented into a bias configuration, without attendant disruption or compromise in the continuity and integrity of associated fluid corrosion barrier and/or thermal barrier components.

A further objective of the present invention is the provision of an improved method for producing the aforesaid expansion joint material as roll goods for use in the fabrication of flue duct seals.

BRIEF SUMMARY OF THE INVENTION

A flexible composite expansion joint material is formed by laminating together a load bearing component comprising a fluoropolymer containing woven fabric substrate with at least one fluoropolymer fluid corrosion barrier component and/or a nonfluoropolymer thermal barrier component. The fluoropolymer containing fabric substrate is initially subdivided into plural segments, each having mutually perpendicular warp and fill yarns. The substrate segments are then reoriented at 45° angles and arranged successively in a longitudinally extending assembly, with the warp and fill yarns of each substrate segment arranged on a bias, i.e., extending obliquely with respect to the assembled length. The assembly of substrate segments is overspread with one or more other components of the composite, including, inter alia, fluoropolymer fluid corrosion barrier film components and/or nonfluoropolymer thermal barrier components. The successive fabric substrate segments are spliced together and integrally joined to the other composite components by lamination under conditions of elevated temperature and pressure. The continuity and integrity of the latter components is thus unaffected by the separate subdivision, reorientation and reassembly of the fabric substrate segments, which takes place prior to their combination with other components of the composite.

These and other objects, features and advantages of the present invention will hereinafter be described in greater detail with reference to the accompanying drawings, wherein:

DETAILED DESCRIPTION OF THE INVENTION

Figure 1:
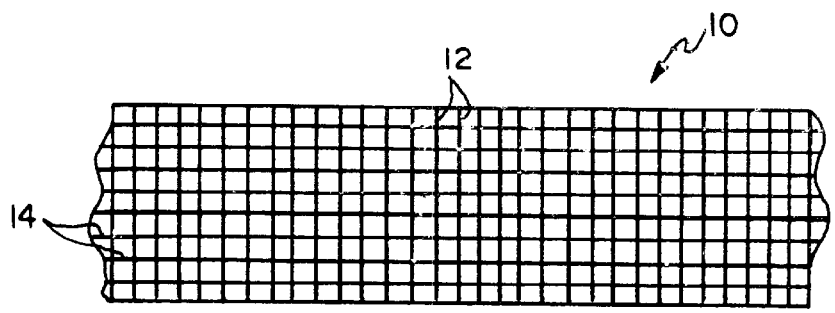
FIG. 1 is a plan view of a fluoropolymer coated woven fabric substrate useful as the load bearing component of a flexible expansion joint material in accordance with the present invention.

With reference initially to FIG. 1, a load bearing component comprising a fluoropolymer containing woven fabric substrate is generally depicted at 10. The substrate is flexible and includes mutually perpendicular warp and fill yarns indicated typically at 12, 14. Such woven fabrics are considered to be "high modulus materials" due to their woven construction, which resists stretching or elongation in the direction of their warp or fill yarns. The fluoropolymer content of the fabric substrate is preferably achieved by coating, but lamination and calendering are other possible alternatives.

Figure 2:
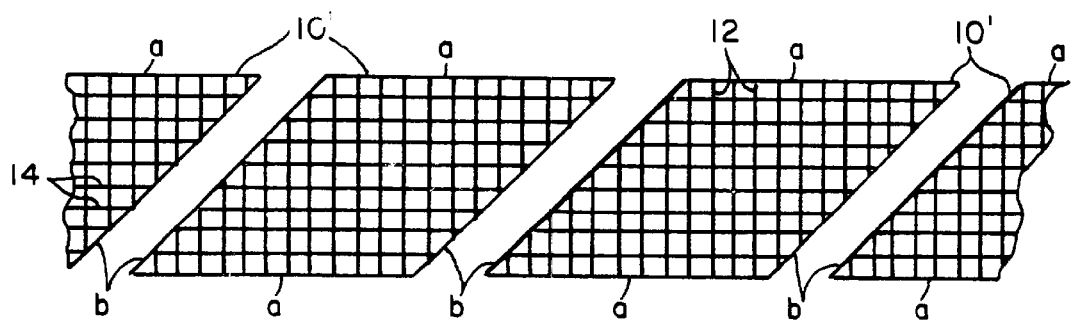
FIG. 2 is a view similar to FIG. 1 showing the fabric substrate subdivided into a plurality of segments.

In accordance with the present invention, and as shown in FIG. 2, the substrate 10 is initially subdivided into a plurality of segments 10', each segment preferably being in the form of a parallelogram with opposite sides "a", "b" forming oblique angles. The parallelograms may define either rhomboids, where only the opposite sides are equal, or rhombuses where all sides are equal.

Figure 3:
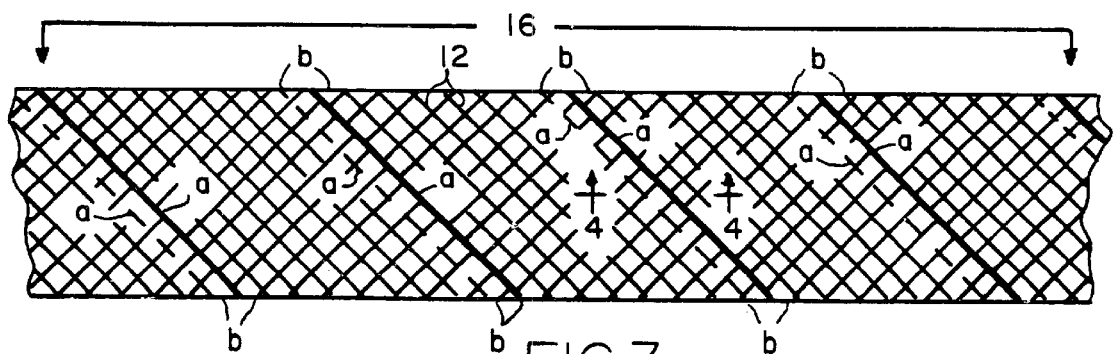
FIG. 3 shows the fabric substrate segments of FIG. 2 reoriented and reassembled into a longitudinally extending assembly, with the warp and fill yarns of each segment arranged on a bias.

As shown in FIG. 3, the substrate segments 10' are then reoriented by 45° and rearranged successively with overlapping adjacent edge regions to form a longitudinally extending assembly 16. The warp and fill yarns 12, 14 of each reoriented segment 10' thus extend obliquely with respect to the length of the assembly 16.

Figure 4A:
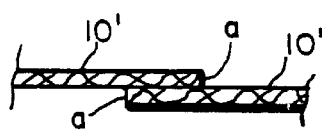
FIGS. 4a and 4b are enlarged partial sectional views taken on line 4—4 of FIG. 3 and showing alternative splicing arrangements.
Figure 4B:
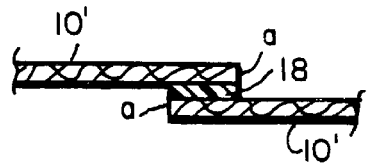

FIGS. 4a and 4b illustrate alternative splicing arrangements for the overlapping edge regions. In FIG. 4a, the edge regions are laminated directly to one another by means of the fluoropolymer coating on the woven substrate. In FIG. 4b, a melt bondable adhesive strip 18 is interposed between the overlapping edge regions to thereby facilitate lamination.

Figure 5:
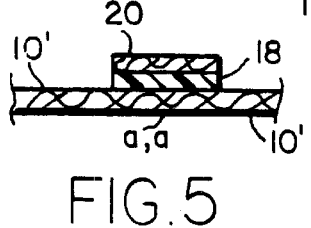
FIG. 5 is a view similar to FIGS. 4a and 4b showing another splicing arrangement.

Another splicing arrangement is disclosed in FIG. 5. Here, the adjacent edge regions of the successive substrate segments are placed in an abutting relationship. The resulting seam is covered by a melt bondable adhesive strip 18 and a strip 20 of the fabric substrate material. Alternatively, the adhesive strip 18 may be eliminated, with the fluoropolymer coating on the strip 20 and abutting segments 10' serving to effect the bond during lamination. The strip 20 may comprise coated or laminated fluoropolymer containing textile products other than the fabric substrate material.

In each of the aforesaid splicing arrangements, the materials are bonded together under conditions of elevated temperature ranging from 660 to 900° F., preferably between 660–770° F., and elevated pressures above 1 p.s.i., with the preferred pressure range being between about 40 to 60 p.s.i. Typical lamination times range between 20–180 seconds, depending on the structure and thickness of the composite. The segments 10' can be joined either before or after they are combined with other composite components.

Figure 7:
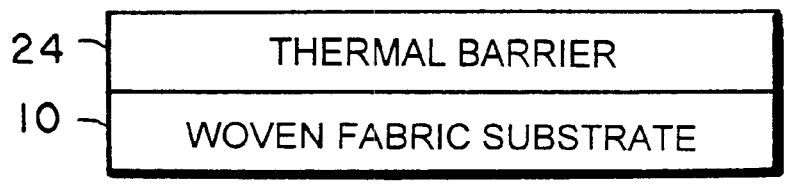
Figure 8:
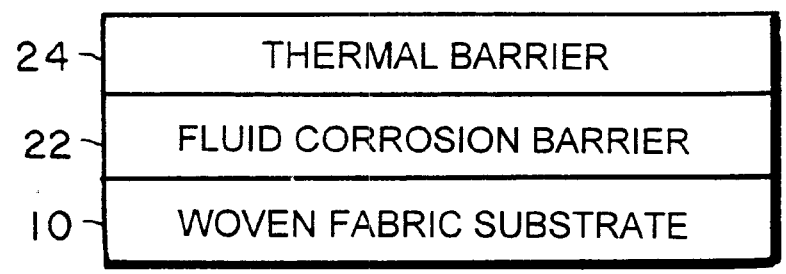
Figure 9:
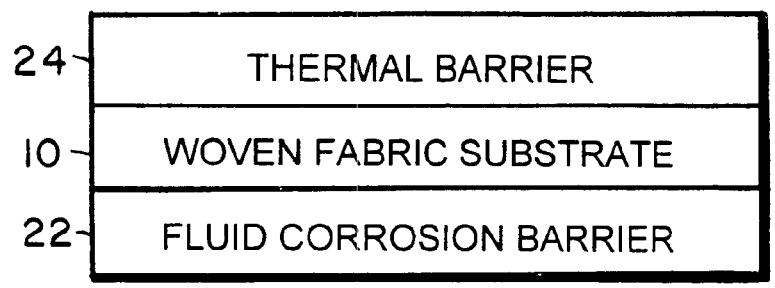

The reoriented and sequentially arranged substrate segments 10' are then overspread by and laminated to other composite components in various combinations. For example, in FIG. 6, the woven fabric substrate 10 is overspread by a fluoropolymer fluid corrosion barrier component 22 to form a two ply construction. In FIG. 7, another two ply construction is shown where the woven fabric substrate 10 is overspread by a thermal barrier component 24. In FIG. 8, a three ply construction includes the fluid corrosion barrier component 22 with the fabric substrate 10 and the thermal barrier component 24 on opposite sides. In FIG. 9, the fabric substrate 10 is overspread on opposite sides with a fluid corrosion barrier component 22 and a thermal barrier component 24.

As noted previously, the reoriented successively arranged fabric substrate segments 10' may be laminated together at their spliced joints either prior to being assembled with other composite components in the examples shown in FIGS. 6–9, or after being assembled with those other components.

The woven fabric substrate 10 may be produced from various materials, including, inter alia, fiberglass, amorphous silica, graphite, polyaramides including Kevlar and Nomex, PBI (polybenzimadazole), ceramics and metal wires, and combinations thereof. Fiberglass is the preferred substrate material.

With the exception of metal wires, the same materials also may be employed to produce the thermal barrier components 24. The thermal barrier components may be woven or nonwoven. Again, fiberglass is the preferred material for the thermal barrier components.

Fluoropolymers useful in the composite expansion joint material of the present invention may be selected from those known to those skilled in the art, as described for example in U.S. Pat. No. 4,770,927 (Effenberger), the disclosure of which is herein incorporated by reference in its entirety.

Commercially available fluoropolymer products useful with the present invention include the following:
Perfluoroplastics
PTFE—Daikin-Polyflon; Dupont Teflon; ICI Fluon; Ausimont Algoflon
FEP—Daikin Neoflon; Dupont Teflon
PFA—Daikin Neoflon; Dupont Teflon; Ausimont Hyflon
MFA—Ausimont Hyflon
Fluoroelastomers
Dupont Viton
3M Fluorel
Ausimont Tecnoflon
Daikin Daiel
Asahi Glass Aflas
Perfluoroelastomers
Dupont Kalrez
Daikin Perfluor The fluoropolymers of the present invention may include fillers, pigments and other additives, examples of which include titanium dioxide, talc, graphite, carbon black, cadmium pigments, glass, metal powders and flakes, and other high temperature materials such as sand, fly ash, etc.

EXAMPLE 1

A flexible composite expansion joint material was produced as a composite comprising a fluoropolymer coated woven fabric substrate 10, a fluoropolymer fluid corrosion barrier component 22 and a nonfluoropolymer thermal barrier component 24 arranged in the configuration shown in FIG. 8, with the fabric substrate 10 comprising subdivided segments reoriented at a 45° bias and arranged with overlapping edges as shown in FIG. 3, and with the overlapping edges spliced with intermediate melt bondable adhesive strips 18 as shown in FIG. 4b.

The substrate 10 was a 20" wide web of TEXCOAT™ 1400, a 32 oz/sq yd woven fiberglass fabric with a basket weave and a yarn count of 24×26 coated on both sides with PTFE and supplied by Textiles Coated International ("TCI") of Amherst N.H. The total weight of the TEXCOAT™ 1400 product was 48 oz/sq yd, with the PTFE coating totaling 16 oz/sq yd. The PTFE dispersion was ALGOFLON D60G supplied by Ausimont U.S.A. of Thorofare, N.J.

The fluid corrosion barrier component 22 was an unsintered 0.004" thick extruded PTFE film supplied by DeWal Corporation of Saunderstown, R.I.

The thermal barrier component 24 was BGF Mat, a ½" thick needled fiberglass insulation mat with a weight of 54 oz/sq yd, supplied by BGF Industries of Greensboro, N.C. A 1.0 oz/sq yd PTFE coating was applied to the side of the insulation mat being laminated to the fluid corrosion barrier component 22.

The adhesive strips 18 comprised 0.003" unsintered PTFE film.

The TEXCOAT™ 1400 web was cut into 45°/135° rhomboids with side dimensions a, b of 28" and 40". The segments were reoriented to place their warp and fill yarns on a bias, and were reassembled with their edges "a" overlapping by 2.0", and with single plies of the adhesive strips 18 interposed therebetween. The assembly of reoriented substrate segments was overspread with the fluid corrosion barrier component 22, which in turn was overspread by the thermal barrier component 24. The stacked materials were laminated at 715° F. for 135 seconds at a pressure of 40 p.s.i.

The finished product weighed approximately 108 oz/sq yd. The product width was 28.4", with the spacing between overlapped splices being 28.2". The fluid corrosion barrier component 22 and the thermal barrier component 24 were each continuous. The product displayed excellent component-to-component adhesion and good flexibility.

EXAMPLE 2

Figure 6:
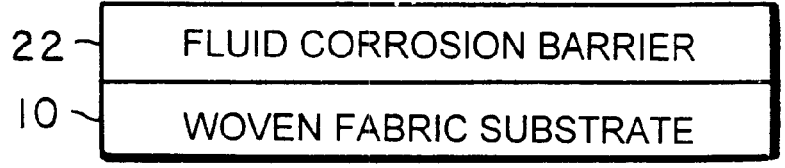
FIGS. 6–9 are cross sectional views diagrammatically depicting different composite constructions in accordance with the present invention.

Another flexible composite expansion material was produced in the configuration shown in FIG. 6.

The substrate 10 was a 7" wide 18 oz/sq yd fiberglass fabric having a 27×14 basket weave and a 16 oz/sq yd PTFE coating supplied by TCI under the trade name TEX-COAT™ 700. The fluid corrosion barrier was a 0.004" thick extruded unsintered PTFE film supplied by TCI under the trade name TEXFILM™ 704.

The substrate was cut into two 45°/135° rhomboid shaped segments with side dimensions a, b, of 9" and 10". The segments were reoriented at a 45° bias with adjacent edges overlapped by 1.5" as shown in FIG. 3. Melt bondable adhesive strips 18 were interposed between the overlapped edges, as shown in FIG. 4b. The strips 18 comprised 5 mil PFA films (500 LP; E. I. Dupont, Wilmington, Del.)

The fluid corrosion barrier component 22 was TCI's LFP 2109, a three ply composite of 0.003" thick uniaxially oriented unsintered PTFE films arranged in accordance with the teachings of U.S. Pat. No. 5,466,531.

The stacked components 10, 22 were laminated at 715° F. for 105 seconds at a pressure of 40 p.s.i. The finished product weighed approximately 38 oz/sq yd. The fluid corrosion barrier component 22 was continuous throughout the product length and covered the 1.5" splice area completely. The splice was well sealed and very flexible.

EXAMPLE 3

Another composite expansion joint material was produced in the configuration shown in FIG. 6. The woven fabric substrate was again TEXCOAT™ 1400 subdivided into three 45°/135° rhomboid-shaped segments reoriented on a 45° bias and arranged with abutting edges as shown in FIG. 5. The abutting edges were covered with 3" wide strips 20 of TEXCOAT™ 1400, with a 5 mil PFA film interposed therebetween as the melt bondable adhesive 18. The fluid corrosion barrier component 22 comprised three plies of unsintered 0.003" PTFE film. The stacked components were laminated at 715° F. for 105 seconds at a pressure of 40 p.s.i.

The finished product weighed approximately 62 oz/sq yd. The fluid corrosion barrier component was continuous over the length of the product. The splices were well sealed and very flexible.

EXAMPLE 4

A flexible composite expansion joint material was manufactured in the form of FIG. 9. The woven fabric substrate, TCI's TEXCOAT™ 1400, was subdivided into two 45°/135° rhomboid-shaped segments reoriented on a 45° bias and arranged with overlapping edges as shown in FIG. 4B.

The dimensions of the rhomboid-shaped segments were 13.4"×14.1". A 0.003" unsintered PTFE film was used as the melt bondable adhesive strip 18.

A 0.004" thick unsintered PTFE film was placed on one side of the TEXCOATTM 1400 product. A ½" fiberglass insulation mat with a PTFE coating was placed on the other side of the TEXCOATTM 1400 product.

The stacked components were laminated at 715° F. for 135 seconds at a pressure of 40 p.s.i. The finished laminated composite weighed approximately 110 oz/sq yd. The width of the finished product was 9.5". The composite displayed a continuous thermal barrier on one side of the fabric substrate and a continuous fluid barrier on the other side. Both the thermal barrier and the fluid barrier revealed excellent bonds in the overlapping splice area.

EXAMPLE 5

A flexible composite expansion joint material was manufactured in the form of FIG. 7. A woven fabric substrate comprising TCI's TEXCOATTM 1400 was subdivided into three 45°/135° rhomboid-shaped segments reoriented on a 45° bias and arranged with overlapping edges as shown in FIG. 4A. The segment dimensions were 28.2"×15" No adhesive was used to seal the overlap splices. A ½" thick fiberglass insulation mat with a PTFE coating was placed on one side of the TEXCOATTM 1400 product.

The stacked components were laminated at 715° F. for 150 seconds at a pressure of 40 p.s.i. The completed flexible laminate contained well bonded splices and a continuous thermal barrier. The 20" wide expansion joint material weighed around 106 oz/sq yd.

In light of the foregoing, it will now be understood by those skilled in the art that the expansion joint materials of the present invention have a unique "pre-biased" construction achieved by segmenting and reorienting only the woven fabric substrate serving as the load bearing component. The continuity and integrity of the other components of the laminated composite remain unaffected. The expansion joint materials of the present invention are ideally suited for supply as roll goods to the expansion joint industry. Such materials may be readily incorporated into expansion joints, with minimum splicing, and with the bias format of the load bearing components enabling the materials to readily elongate when stressed during service.

I claim:

1. A method of fabricating a flexible laminated composite expansion joint material comprising:
    a) providing a length of a fluoropolymer containing woven fabric, said fabric having mutually perpendicular warp and fill yarns;
    b) longitudinally subdividing said fabric into plural segments;
    c) arranging said segments successively in a longitudinally extending assembly with said warp and fill yarns extending obliquely with respect to the length of said assembly;
    d) overspreading the length of said assembly with at least one other component;
    e) splicing the successive sections of said assembly together; and
    f) laminating the thus spliced sections to said other component under conditions of elevated temperature and pressure.

2. The method of claim 1 wherein the splicing of said successive segments and the joining thereof to said other component is accomplished simultaneously.

3. The method of claim 1 wherein the splicing of said successive segments is accomplished prior to the joining thereof to said other component.

4. The method of claim 1 wherein said plural segments define parallelograms with oblique angles.

5. The method of claim 4 wherein said plural segments define rhomboids.

6. The method of claim 4 wherein said plural segments define rhombusses.

7. The method of claim 1 wherein said successively arranged segments have overlapping edge regions.

8. The method of claim 7 wherein a melt bondable adhesive is interposed between said overlapping edge regions prior to lamination.

9. The method of claim 8 wherein said melt bondable adhesive a fluoropolymer.

10. The method of claim 1 wherein said successively arranged segments have abutting edge regions, and wherein said edge regions are overlapped by a connecting strip.

11. The method of claim 10 wherein a melt bondable adhesive is interposed between said edge regions and said connecting strip.

12. The method of claim 11 wherein said melt bondable adhesive is a fluoropolymer.

13. The method of claim 1 wherein said warp and fill yarns extend at 45° angles with respect to the length of said assembly.

14. The method of claim 1 wherein said other component is a fluoropolymer fluid corrosion barrier.

15. The method of claim 1 wherein said other component is a nonfluoropolymer thermal barrier.

16. The method of claim 1 wherein said other component comprises a fluoropolymer fluid corrosion barrier, and another component comprises a nonfluoropolymer thermal barrier.

17. The method of claims 14 or 16 wherein said fluoropolymer fluid corrosion barrier comprises at least one polytetrafluoroethylene film unsintered prior to lamination.

18. The method of claims 1, 9 or 12 wherein said fluoropolymer is a perfluoroplastic.

19. The method of claim 18 wherein said perfluoroplastic is blended with a fluoroelastomer.

20. The method of claim 18 wherein said perfluoroplastic is polytetrafluoroethylene.

21. The method of claim 18 wherein said perfluoroplastic is fluorinated ethylene propylene.

22. The method of claim 18 wherein said perfluoroplastic is perfluoroalkoxy.

* * * * *